Patented Jan. 30, 1923.

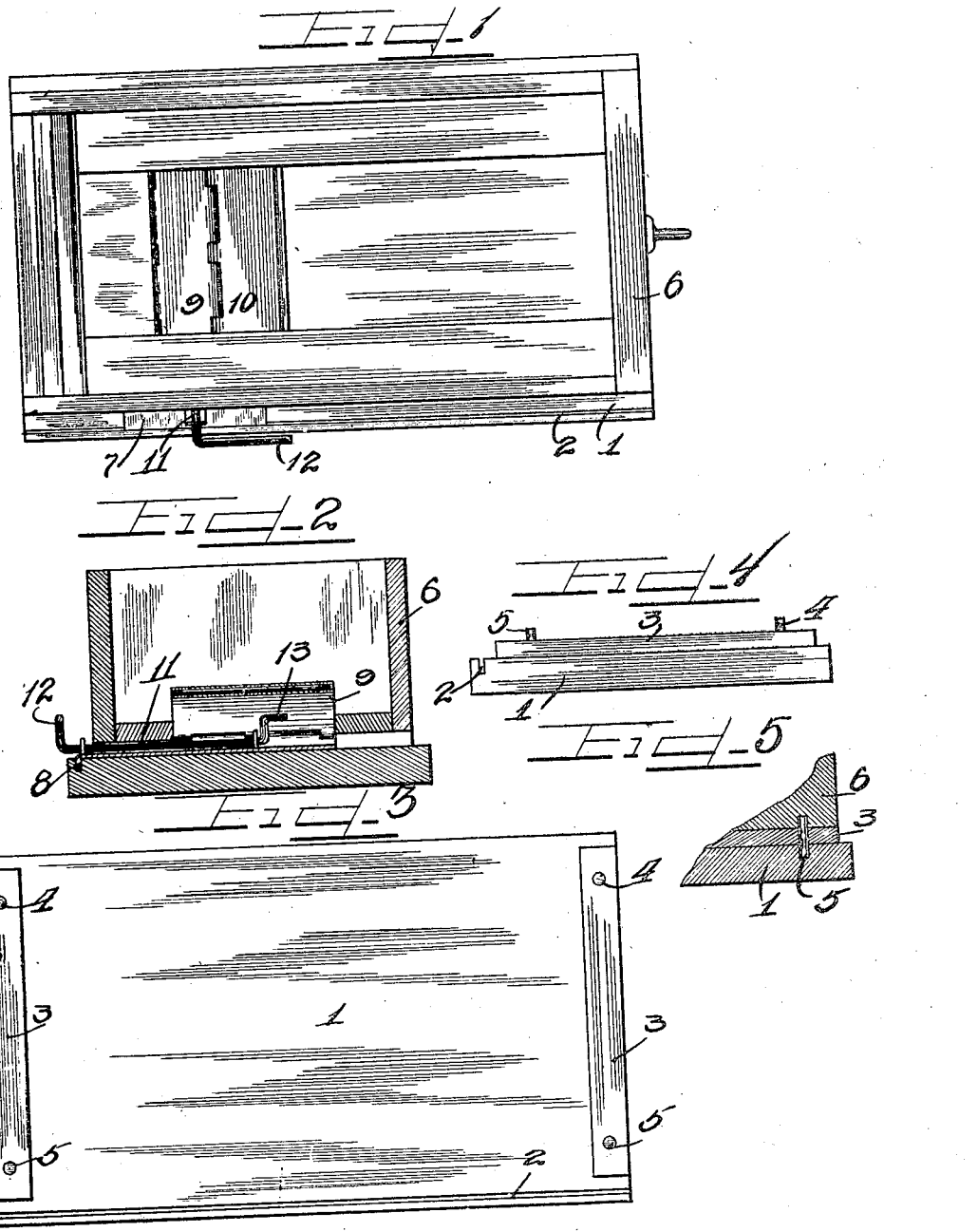

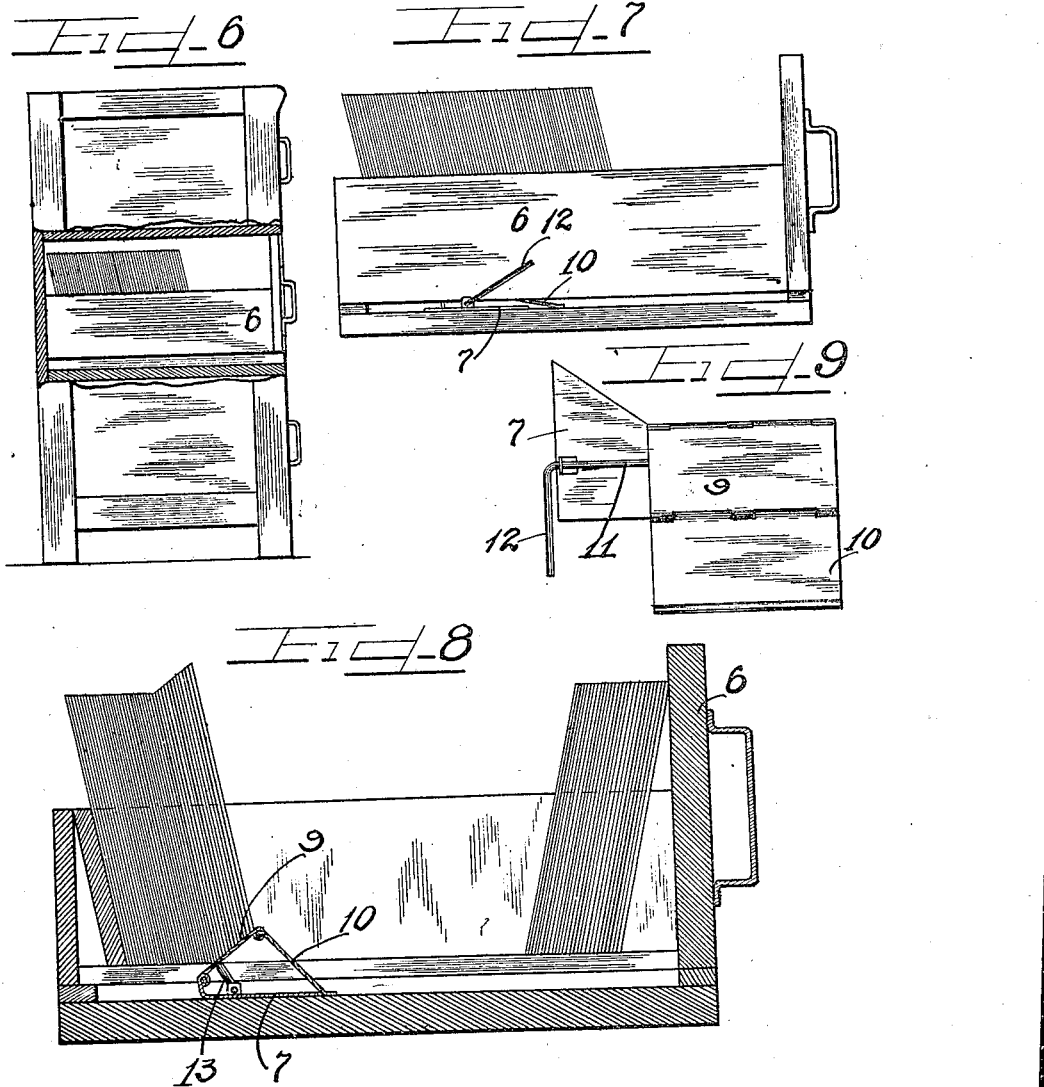

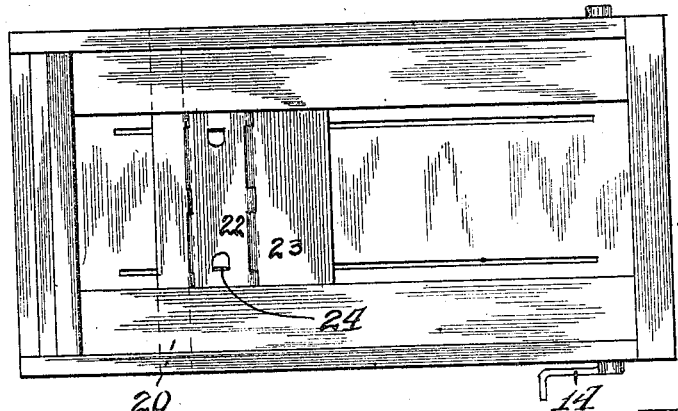
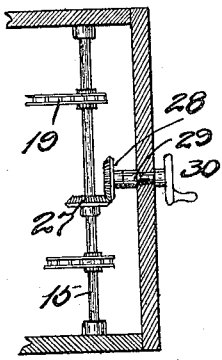
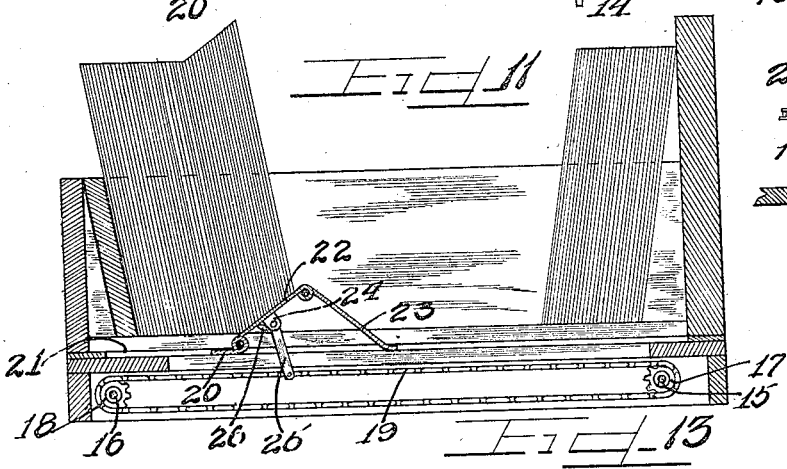
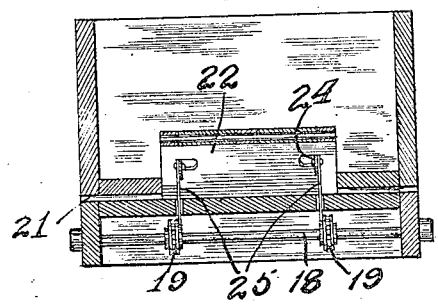
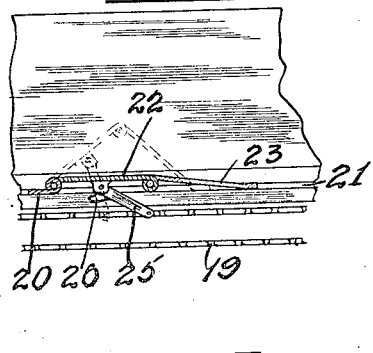

1,443,566

UNITED STATES PATENT OFFICE.

ALEXANDER DOM, OF CINCINNATI, OHIO, ASSIGNOR TO WILSON-JONES LOOSE LEAF COMPANY, OF CHICAGO, ILLINOIS, A CORPORATION OF ILLINOIS.

LEAF-UPSETTING TRAY FOR VERTICAL FILES FOR MACHINE BOOKKEEPING.

Application filed January 2, 1918. Serial No. 209,921.

*To all whom it may concern:*

Be it known that I, ALEXANDER DOM, a citizen of the United States, and a resident of the city of Cincinnati, in the county of Hamilton and State of Ohio, have invented certain new and useful Improvements in a Leaf-Upsetting Tray for Vertical Files for Machine Bookkeeping; and I do hereby declare the following is a full, clear, and exact description of the same, reference being had to the accompanying drawings, and to the numerals of reference marked thereon, which form a part of this specification.

It is an object of my invention to provide a device for upsetting leaves in a drawer or file whereby the leaves are upset in such a manner that the upper edge of the leaves may be readily engaged by the fingers for removing the leaves from the file.

It is further an object of my invention to provide an upsetting device for loose leaves by means of which the leaves may be upset with the outer leaf projecting above the rear leaves and the succeeding leaves stepped down so that each leaf is higher than its immediate succeeding leaf.

It is a further and an important object of my invention to provide an upsetting tray on which a file or filing drawer may be set and which, when in place, may upset any of the leaves in the drawer for the purposes hereinbefore set forth.

It is further an object of my invention to provide an upsetting tray which is adapted to be used in combination with any ordinary drawer or file and which, when the drawer is assembled or associated therewith, is adapted to upset any of the leaves in the drawer.

It is further an object of my invention to provide an upsetting tray in which the upsetting member is adapted to lie flat below the leaves and is adapted to be adjusted to the desired position before being actuated to upset the leaves.

It is further an object of my invention to provide an upsetting tray in which the entire mechanism may be operated by a crank or handle at the front or side of the tray.

Other and further important objects of this invention will be apparent from the disclosures in the specification and drawings.

The invention (in a preferred form) is illustrated in the drawings and hereinafter more fully described.

On the drawings:

Figure 1 is a top plan view of an upsetting tray embodying my invention, with a file or drawer associated therewith.

Figure 2 is a section taken transversely through the tray and drawer.

Figure 3 is a plan view of the tray with the upsetting device removed.

Figure 4 is an end elevation of the tray.

Figure 5 is an enlarged fragmentary sectional detail taken through one of the attaching posts.

Figure 6 is a side elevation of a filing cabinet with part broken away to illustrate the drawer in the file.

Figure 7 is a side elevational view of a drawer and tray.

Figure 8 is a longitudinal section of the drawer and tray.

Figure 9 is a plan view of the upsetting device.

Figure 10 is a plan view of a modified form of upsetting tray with a drawer seated thereon.

Figure 11 is a longitudinal section taken through the drawer and tray.

Figure 12 is a transverse section taken through the tray and drawer.

Figure 13 is a fragmentary detail section of the upsetting device.

Figure 14 is an enlarged fragmentary detail section illustrating a modified form of actuating mechanism for the upsetting device.

As shown on the drawings:

The reference numeral 1, indicates the base of the tray, which is provided with a longitudinal guide groove 2, along one side thereof. Secured to each end of the base is a bar or strap 3, of metal, provided with attaching posts or pins 4 and 5, which are adapted to fit in apertures or recesses in the corner of the drawer 6, as shown in Figure 5, when the drawer is seated on the tray.

The upsetting device is slidable on the tray and comprises a plate of metal 7, having a downturned flange 8, which fits in the groove 2. Hinged to one edge of plate 7, is a plate 9, to which in turn is hinged a plate 10. Pivoted to the plate 7, is a shaft 11, having an outer actuating handle 12, and a cam 13, is provided on the inner end of said shaft by means of which the plates are upset to assume the position shown in Figure 8.

110

As clearly shown in Figures 1 and 2, the drawer 6, has a slot in the bottom thereof, which is of sufficient width for the plates of the upsetting device to move freely therein. As shown in Figures 10 to 13, inclusive, the upsetting device is operated by a crank 14, at one side of the tray. In this construction, shafts 15 and 16, are provided, one journalled in each end of the tray and secured thereto are sprocket wheels 17 and 18, around which are trained sprocket chains 19. The upsetting device comprises a plate 20, slidable in a slot 21, in the tray, and hinged to the plate 20, is a plate 22, to which is hinged a plate 23. Lugs 24, are struck from said plate 22, one above each chain 19, and pivoted to said lugs and said chains are links 25, each of which is provided with a cam 26.

In Figure 14, the construction is the same as shown in Figures 10 to 13, except that the shaft is actuated from the end of the tray. As shown, a bevel gear 27, is keyed to shaft 15, which meshes with a bevel gear 28, on shaft 29, which is provided with a crank 30.

The operation is as follows:

In the construction shown in Figures 1 to 9, inclusive, the drawer is removed from the cabinet and set on the tray by engaging the posts 5, in the apertures in the corner of the drawer. The upsetting device is adjusted to the desired position by sliding the same over the tray beneath the leaves, after which the handle 12, is actuated to rotate the shaft 11, thereby turning the cam 13, to elevate the plates 9 and 10, into the position shown in Figure 8. In this position, the leaves resting on the inclined surfaces formed by plates 9 and 10, are upset into position to be readily engaged and removed from the drawer. Friction holds the cam in this position until the shaft is manually actuated to lower the upsetting members.

In the construction shown in Figures 10 to 14, inclusive, by rotation of the shaft to the right, the plates 22 and 23, are lowered, and the chains through the links 25, pull the upsetting device forward to any position. In this position, reverse rotation of the shaft pushes and elevates the outer end of the link, and the cam striking plate 22, causes said plates 22 and 23, to be adjusted into the upsetting position shown in Figure 11. The friction of plate 20, in its groove, is greater than the resistance offered to the hinged plates 22 and 23, consequently they will upset when the chain is turned to the left. If actuation of the chain is continued after the plates are upset, the resistance of the plate 20, is overcome, and the plates in the upset position are forced along the drawer to the left, and the leaves ride over the top of the upsetting members.

In the construction shown in Figures 10 to 14, the complete operation of the upsetting mechanism is effected by the handles or cranks 14 or 30, located at the side or end of the base or tray. In any event, it will be noted that I have provided an upsetting tray which is adapted for use with any number of drawers or files by simply setting the drawers on the tray.

Numerous changes may be made and details of construction may be varied through a wide range without departing from the principles of my invention, and I therefore do not purpose limiting the patent granted otherwise than necessitated by the prior art.

I claim as my invention:

1. In a device of the class described, a tray, posts secured thereto, and an upsetting device adjustable over the top of the tray.

2. In a device of the class described the combination with a filing drawer, of a supporting tray, means for connecting the drawer with the tray, an upsetting mechanism adjustably secured to the tray, and means for actuating said upsetting mechanism.

3. An upsetting tray comprising a base member, posts secured thereto, a pair of pivotally connected plates adjustable over the top of the tray, and means for adjusting said plates to form oppositely inclined supporting walls.

In testimony whereof I have hereunto subscribed my name in the presence of two subscribing witnesses.

ALEXANDER DOM.

Witnesses:
  CHARLES W. HILLS, Jr.,
  FRED E. PAESLER.